Jan. 29, 1946. H. B. KRAUT ET AL 2,393,696
MACHINE TOOL
Filed March 20, 1944 5 Sheets-Sheet 5

Inventors
Hans B. Kraut
Keith F. Gallimore
By
Carlson, Pitzner, Hubbard & Wolfe
Attorneys.

Patented Jan. 29, 1946

2,393,696

UNITED STATES PATENT OFFICE 2,393,696

MACHINE TOOL

Hans B. Kraut and Keith F. Gallimore, Fond du Lac, Wis., assignors to Giddings & Lewis Machine Tool Co., Fond du Lac, Wis., a corporation of Wisconsin Application March 20, 1944, Serial No. 527,174

5 Claims. (Cl. 29—26)

The invention relates generally to machine tools, and more particularly to machines for operating on relatively large heavy workpieces.

The primary object of the invention is to provide a machine tool of the above general character which affords a high degree of flexibility with respect to the presentation of tools to the work and to the relative movements thereof, thereby materially increasing the versatility of the machine, and adapting it for the performance of a wide variety of machining operations heretofore requiring separate machine tools.

Another object is to provide an improved machine tool embodying novel features of construction which not only greatly increase the number and type of machining operations capable of being performed therewith, but enable the machine to perform such operations on large workpieces with a high degree of precision.

Another object is to provide a universal machine tool capable of accurately and efficiently performing a wide variety of machining operations such as boring, drilling, facing, milling and turning.

Still another object is to provide an improved machine tool structure in which the tools are supported on upright columns arranged for bodily adjustment with reference to the work support and interconnected in a novel and advantageous manner to impart greater strength and rigidity thereto.

A further object is to provide an improved machine tool capable of performing many different machining operations on the top, sides and ends of a workpiece in a single setting of the same.

Other objects and advantages of the invention will become apparent from the following detailed description of the preferred embodiment illustrated in the accompanying drawings in which.

Figure 1:
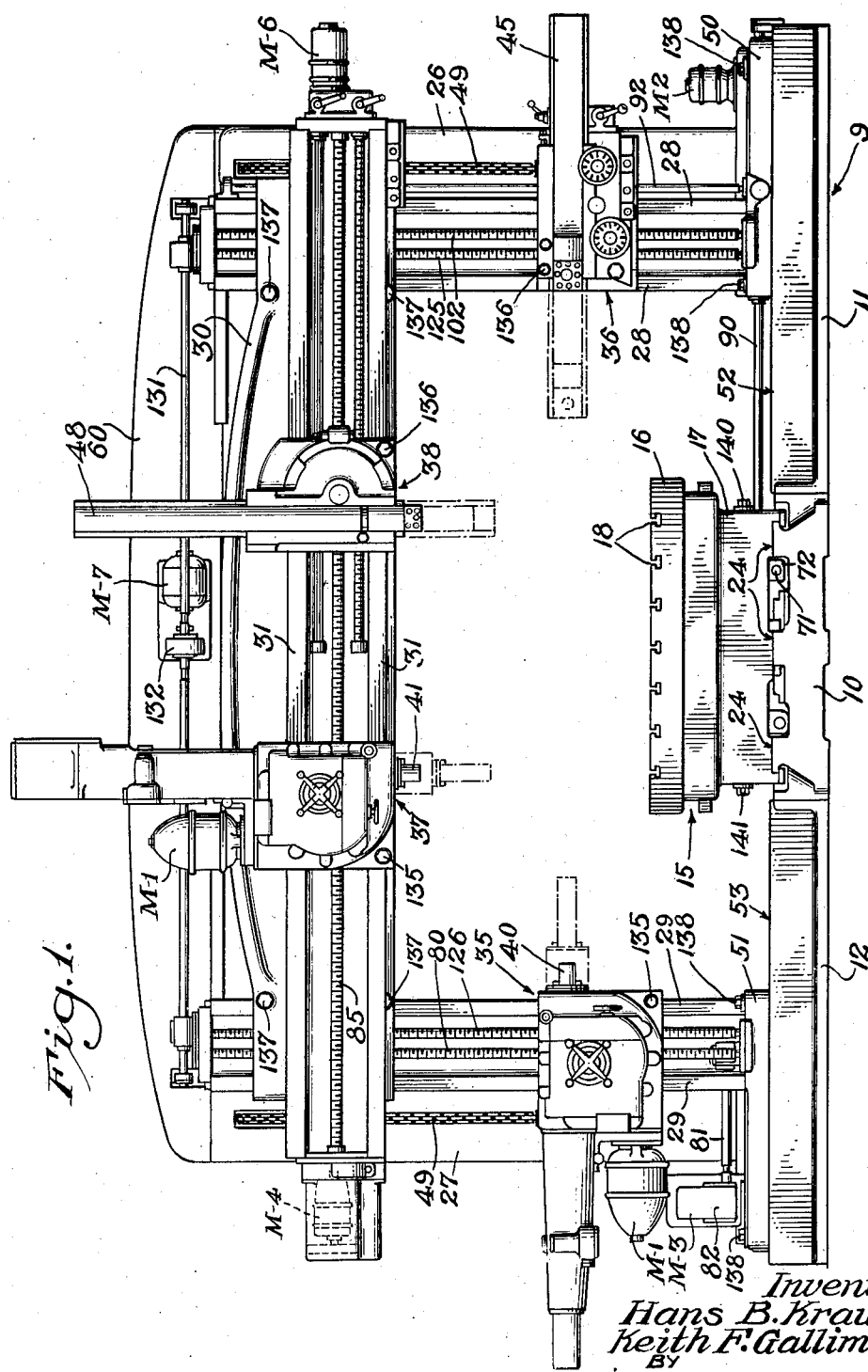
Figure 1 is a front elevational view of a machine tool embodying the features of the invention.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

In carrying out the invention we provide an organization of work and tool supporting elements which are relatively adjustable and relatively movable in a manner adapted to afford maximum flexibility with respect to the number and type of machine operations which can be performed. To obtain the relative feeding movements required for the different types of machining operations adapted to be performed, the work is supported so that it may be translated horizontally or rotated about a vertical axis as desired. Such movements are also advantageous in the adjustment of the tools and work to present selected areas for action thereon by the tools.

Accommodations are provided for a wide variety of tools and the proper presentation of such tools to the work for the different types of machining operations is insured by the provision of upright supporting members or columns at opposite sides of the work support upon which tool carrying elements may be mounted directly and which also support a cross member or rail upon which other tool carrying elements may be mounted. The tool carrying elements are each individually movable relative to their respective supports for adjustment or feeding purposes and in addition the tool supports themselves are adjustable with respect to the work support. Such adjustability is attained, however, without sacrifice of strength or rigidity of the machine structure by interconnecting the supporting members and mounting the cross member thereon in a novel manner.

Referring to the drawings, the improved machine tool is shown herein as having a rigid, generally T-shaped base or bed 9 constructed in sections including an elongated central section 10 and side sections 11 and 12. The sections 11 and 12 are arranged substantially at right angles to the central section and on opposite sides thereof and may be secured thereto in any suitable manner.

The central bed section 10 carries a work supporting structure 15 so arranged that the work may be translated horizontally or rotated about a vertical axis as required for the particular machining operations to be performed. To this end, the work supporting structure comprises a table 16 mounted for rotation about a vertical axis upon a slide 17 which, in turn, is supported and guided for movement longitudinally of the bed section 10. The particular table shown is generally circular in form, and has T-slots 18 in its upper face by means of which the work may be securely clamped thereto.

Figure 2:
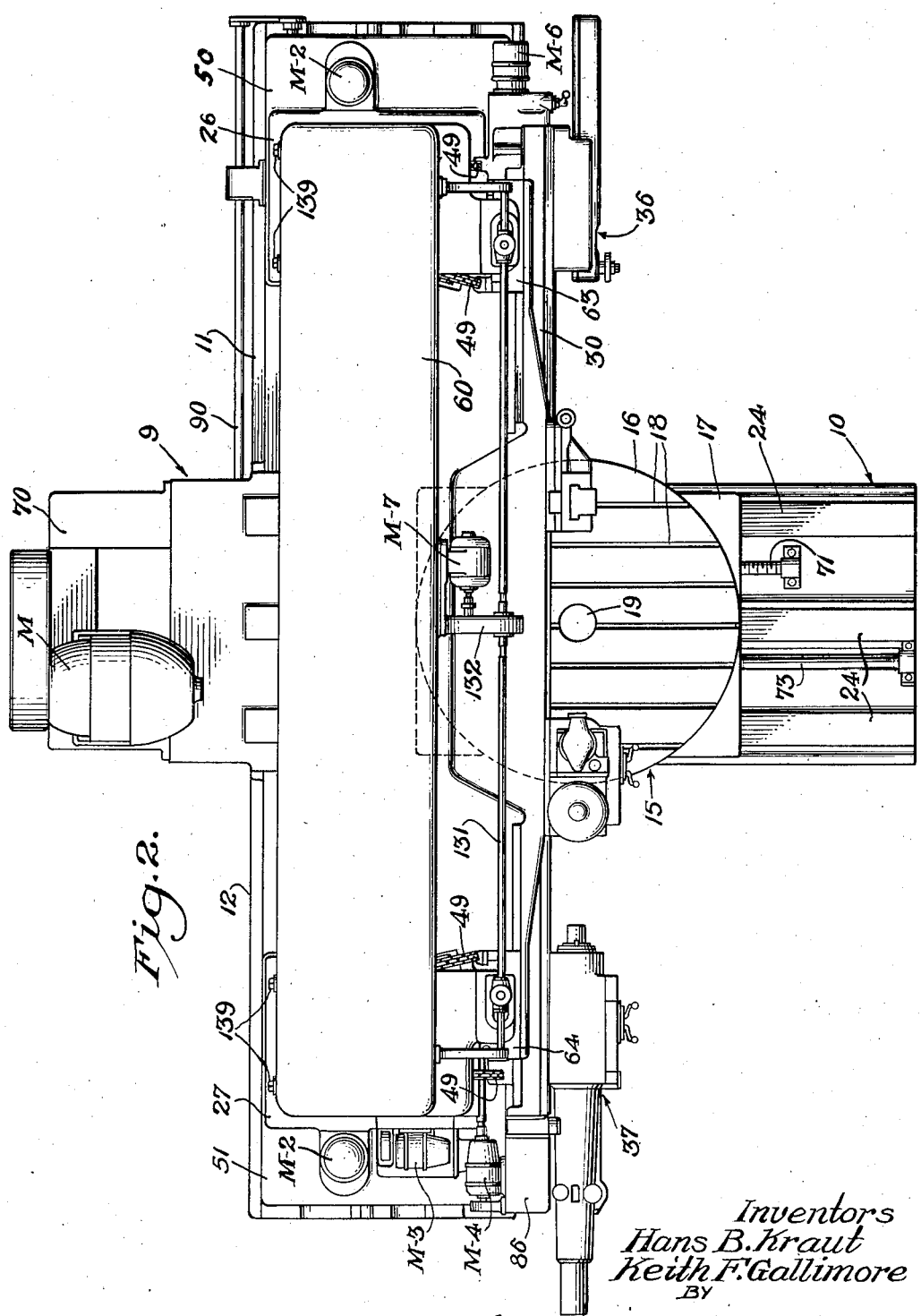
Fig. 2 is a plan view of the machine tool.

In order to maintain the workpiece rigidly in position during a machining operation, the table 16 is preferably supported at its peripheral margin by a wide annular bearing surface formed on the top of the slide 17. An accurately ground spindle 19 (Fig. 2) rigidly fixed to the table coaxially therewith is adapted to cooperate with a suitable bearing (not shown) on the slide to insure true running of the table on the bearing surface. Support for the slide 17 is provided by spaced parallel horizontal ways 24 extending longitudinally of the bed section 10.

For supporting tools in position to operate on work carried by the table 16, upright columns 26 and 27 are mounted on the bed sections 11 and 12 respectively at opposite sides of the table. The columns are provided on their front faces with spaced parallel vertical ways 28 and 29 for supporting and guiding tool carrying elements which may be of any preferred type. The ways 28 and 29 additionally support and guide a cross member or rail 30 having spaced parallel horizontal ways 31 upon which additional tool carrying elements may be adjustably mounted.

For increased versatility, the exemplary machine is equipped with tool carrying elements of two specifically different types. Thus a spindle headstock 35 is adjustably mounted on the ways 29 of the column 27, and a turning head 36 is similarly mounted on the ways 28 of the column 26. The cross rail 30 carries both a spindle headstock 37 and a boring and turning head 38, the headstock and head being adjustably mounted on the ways 31.

The headstocks 35 and 37 may be of any preferred construction, and as herein shown are of conventional type. The headstock 35 has a horizontally disposed spindle 40 adapted to be rotatably driven and to be translated axially. A vertically disposed spindle 41 provided in the headstock 37 is also adapted to be rotated and translated axially. Each headstock is provided with a motor M1 for driving and translating the associated spindle. The spindles 40 and 41 are adapted to carry a variety of tools for performing various machining operations, including milling, drilling, boring and reaming.

The heads 36 and 38 may also be of conventional construction. As the head 36, in this instance, is adapted primarily for use in turning and facing operations, it is provided with a horizontally disposed tool slide or ram 45 movable longitudinally toward or from the work support. The head 38 is adapted for vertical boring as well as turning and facing operations. It is therefore conveniently equipped with a longitudinally movable tool slide or ram 48 having a swivel mounting which permits adjustment for vertical or angular movement of the ram.

Each of the vertically movable machine elements is counterbalanced, the counterweights being housed within the columns 26 and 27 and connected with the respective elements by flexible connecting members, such as roller chains 49 running over sprocket wheels 49' journaled on the columns.

While the improved machine is of large size and especially suited for machining large workpieces, it is a general purpose machine, and may often be used to advantage in machining comparatively small workpieces. Increased flexibility in adapting the machine for workpieces of different sizes is afforded by mounting the columns 26 and 27 for adjustment toward and from the work support 16 so that the headstock 35 and head 36 may be shifted bodily relative to the work support through a range which may far exceed the range of travel of the tool carrying spindle 40 or the ram 45. Such adjustment is also advantageous in keeping spindle or ram overhang at a minimum, thus insuring the most rigid support for the tools required for high precision machining operations.

To provide the adjustment above referred to, the columns 26 and 27 are mounted on sub-bases 50 and 51 adapted to travel on spaced parallel horizontal ways 52 and 53 formed respectively on the upper faces of the bed sections 11 and 12. In the exemplary machine, the ways 52 and 53 are disposed at right angles to the ways 24 for the work support 16. Translation of the column 26 along its ways may be effected in any suitable manner, as by a pinion 54 (Fig. 4) journaled on the sub-base 50, and meshing with a rack 55 extending longitudinally of the bed section 11. Adjustment of the column 27 on the ways 53 may be similarly effected by a pinion 57 (Fig. 3) journaled on the sub-base 51 and meshing with a rack 58 extending longitudinally of the bed section 12. Individual driving motors M2 are mounted on the column bases 50 and 51 for driving the pinions 54 and 57 respectively.

Figure 3:
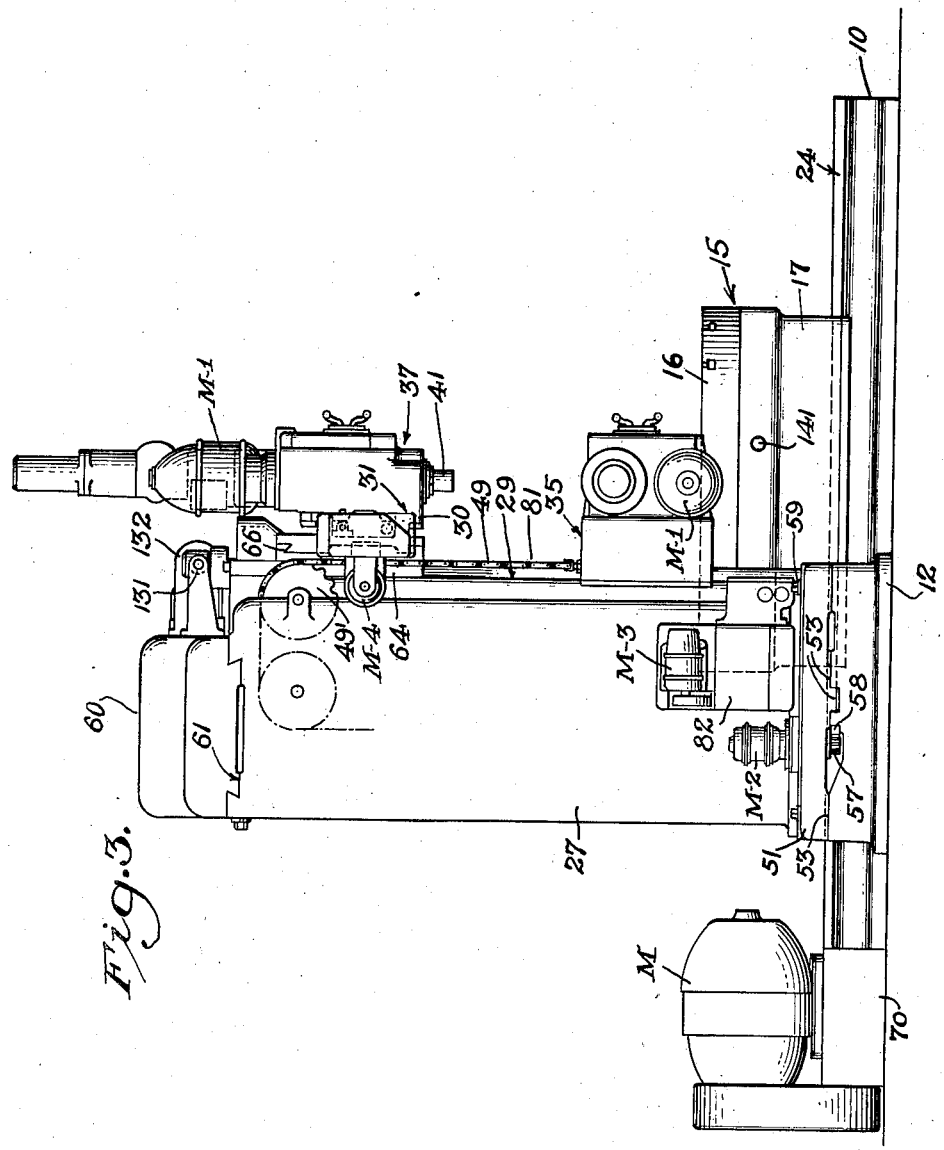
Figs. 3 and 4 are, respectively, left and right end elevational views of the machine tool.
Figure 4:
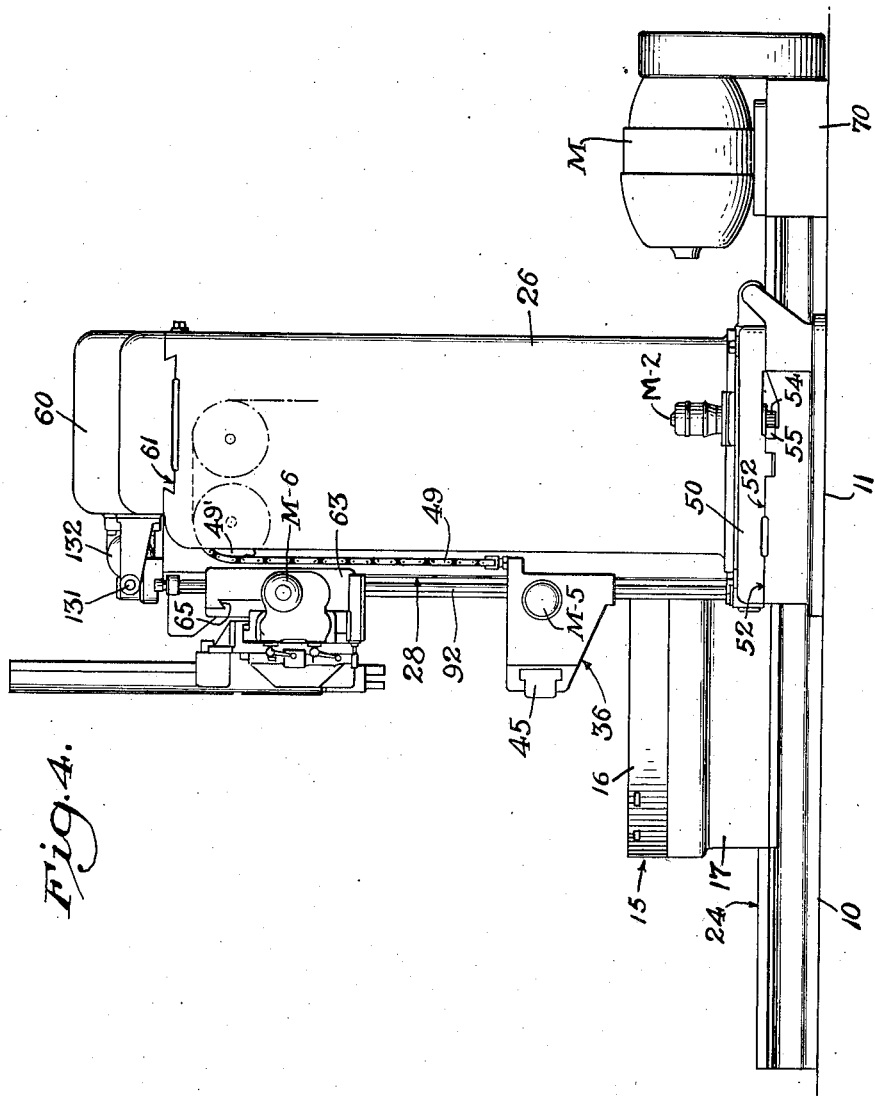

Means is provided for interconnecting the upper ends of the columns 26 and 27 to impart maximum strength and rigidity to the machine structure and thereby enhance the precision functioning of the machine. Such interconnection is effected, in the present instance, by a rigid cross member 60 herein shown as an arch extending over the tops of the respective columns. To permit adjustment of the columns as above described, the arch and columns are connected by dovetail slides 61 as shown in Figs. 3 and 4. In the particular machine illustrated, the male members of the slides 61 are formed on the underside of the arch adjacent the ends thereof and the female members are formed on the tops of the columns.

To avoid interference with the adjustment of the columns 26 and 27, the cross rail 30 is mounted thereon in a novel manner. For this purpose, saddles 63 and 64 (Figs. 2, 3 and 4) are secured to the rear face of the rail adjacent opposite ends thereof by sliding connections which permit adjustment of the saddles longitudinally of the rail. The connections, in this instance, are in the form of dovetail slides 65 and 66, the male members of the slides being formed on the rail and the female members on the respective saddles. The saddles in turn are supported and guided for vertical movement on the column ways 28 and 29. Either column may therefore be adjusted to any selected position on its supporting and guiding ways without interference from the cross rail since the saddles 63 and 64 are simultaneously adjustable along the rail. The cross rail, of course, may be adjusted vertically in any position of the columns by appropriate vertical movements of the saddles on the column ways.

Power operated means is provided for adjusting or feeding the various movable elements of the improved machine tool. Thus translation of the slide 17 and rotation of the work table 16 is effected by driving means including a motor M (Figs. 2–5) acting through a suitable transmission enclosed in a housing 70 at the rear of the central bed section 10. A feed screw 71 extending from the housing longitudinally of the ways 24 coacts with a nut 72 (Fig. 1) on the slide to move the latter back and forth along the ways. Through suitable clutch means or the like incorporated in the transmission, driving connections may be engaged to rotate the screw 71 so as to move the slide in either direction and at either feed or rapid traverse rates or the driving connections may be disengaged to permit the slide to remain stationary.

Figure 5:
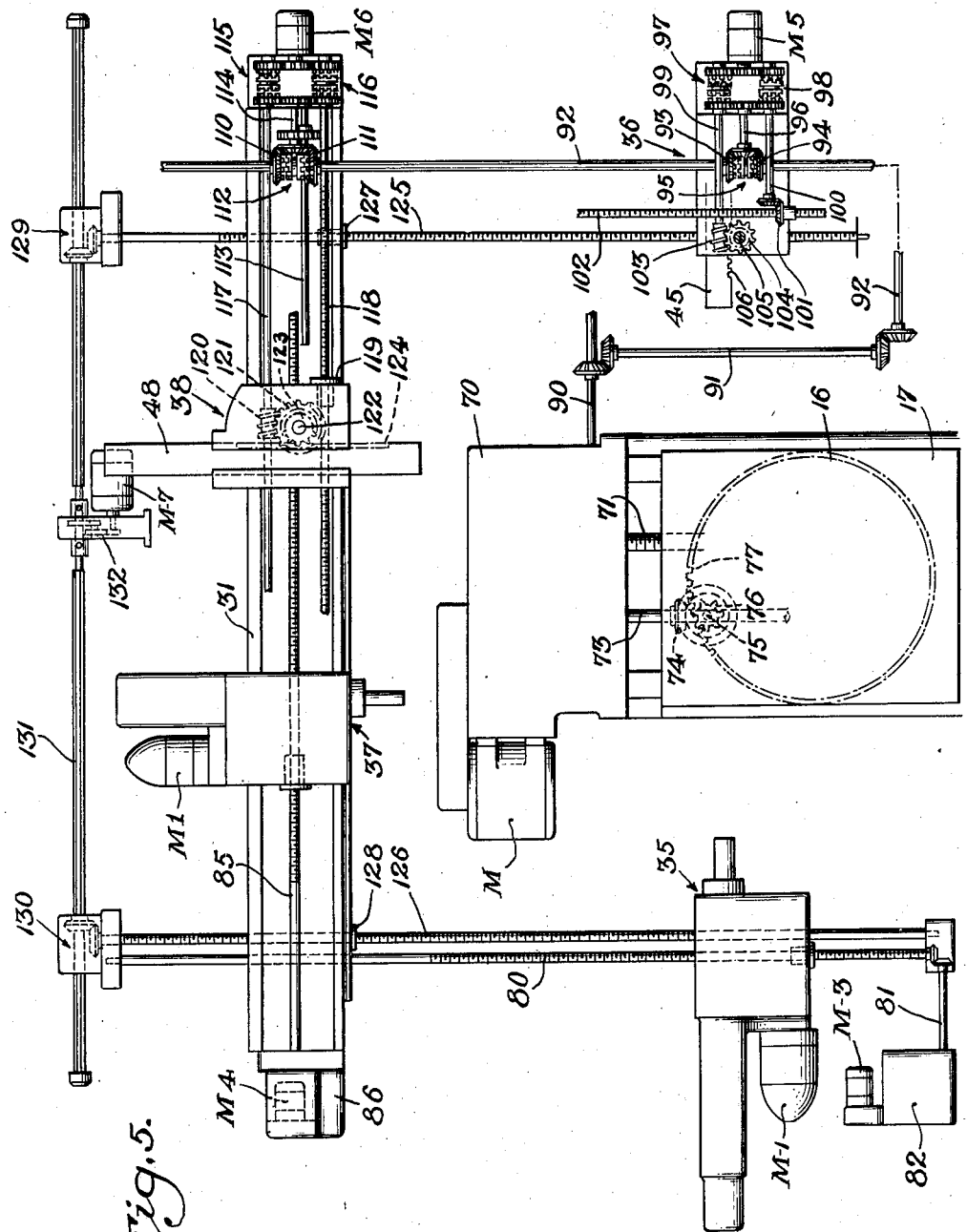
Fig. 5 is a diagrammatic view illustrating the drives for the various machine elements.

A shaft 73 extending from the housing 70 longitudinally of the ways 24 is arranged to impart rotation to the table 16 in any position of the slide 17. As shown in Fig. 5, gearing 74 journaled in the slide 17 and having a splined connection with the shaft 73 is arranged to drive a vertical shaft 75 having a pinion 76 meshing with an internal gear 77 rigid with the table. Suitable controls are provided in the transmission so that the table may be stopped and held stationary in any selected position or may be rotated in either direction and at either feed or rapid traverse rates.

In the exemplary machine, the headstocks 35 and 37 are adapted to be traversed along their respective ways by rotatable feed screws. Thus a vertically disposed elevating screw 80 is provided for raising and lowering the headstock 35. The screw 80 is driven, in this instance, through an intermediate shaft 81 (Figs. 1 and 5) and transmission 82 by a motor M3. The transmission of course includes suitable clutches or the like whereby the elevating screw may be rotated in either direction or stopped as required by the particular work to be done. The motor and transmission are preferably mounted on the column base 51.

The headstock 37 is translated along the ways 31 of the cross rail 30 by means of a feed screw 85 extending longitudinally of the rail. Suitable clutch means is provided whereby the feed screw may be driven in either direction and at either feed or rapid traverse rates or may be maintained idle if desired. Power for driving the feed screw is derived from a motor M4 through transmission 86 mounted at one end of the cross rail.

Since the turning head 36 and turning and boring head 38 are designed for performing operations requiring either rotation or translation of the work, it is desirable to coordinate the movements of the heads along their ways with the movements of the work support. Such coordination can be obtained in various ways. In the particular machine illustrated, the coordination is obtained by utilizing the work support driving transmission for driving the heads in their feeding movements. Separate motors are provided, however, for imparting rapid traverse movements to the heads as will appear presently.

As shown in Fig. 5 of the drawings, the drive for the heads 36 and 38 is taken through a shaft 90 extending from the transmission housing 70 along the back of the machine bed and having an adjustable driving connection with a cross shaft 91 journaled in the base 50 of the column 26. The shaft 91 drives a vertical shaft 92 (Figs. 1 and 5) extending through the head 36 and through the saddle 63 supporting the right end of the cross rail 30. A pair of bevel gears 93 and 94 loosely mounted on the shaft 92 are adapted to be connected thereto selectively by a clutch member 95 and, when so connected, operate to drive an intermediate shaft 96 in either a forward or a reverse direction. The shaft 96 is adapted to be connected selectively by clutches 97 and 98 with either a ram driving shaft 99 or a head feeding shaft 100. The shaft 100 drives a nut 101 journaled in the head and in threaded engagement with a stationary screw 102 extending vertically between the column ways 28. The shaft 99 carries a worm 103 arranged to drive a worm wheel 104 fast on a cross shaft 105 which has a pinion meshing with a rack 106 rigid with the ram 45. Thus, by suitable manipulation of the clutches 95, 97 and 98 the work support driving motor M may be conditioned to raise or lower the head 36 or the ram 45 may be moved toward or from the work support at feeding rates accurately coordinated with the rate of movement of the work support.

For imparting rapid traverse movements to the head 36 and ram 45, a reversible motor M5 is mounted directly on the head and is adapted to be connected selectively with the shafts 99 and 100 through the medium of the clutches 97 and 98. It will be understood, of course, that the clutches may be set in a neutral position to interrupt both rapid traverse and the feed movements of the head or ram when desired.

As stated heretofore, the vertical drive shaft 92 extends through the saddle 63 which supports the cross rail 30 adjacent its right end (as viewed in Fig. 1). A pair of bevel gears 110 and 111, loosely mounted on the shaft 92 are adapted to be connected thereto selectively by a clutch 112 to drive a horizontal spline shaft 113 journaled in the saddle and extending along the back of the rail 30. The shaft 113 in turn has a sliding connection with an intermediate shaft 114 journaled on the cross rail and adapted to be connected selectively by clutches 115 and 116 with either a ram driving shaft 117 or a head feeding screw 118, both extending longitudinally of the ways 31. The screw 118 is in threaded engagement with a nut 119 anchored in the head 38 whereby the head may be traversed along the ways 31 in response to the rotation of the screw 118.

The ram driving shaft 117, as shown in Fig. 5, has a splined connection with a worm 120 rotatably supported in the head 38. The worm 120 drives a worm wheel 121 fast on a cross shaft 122 which has a pinion 123 meshing with a rack 124 rigid with the ram 48. The driving mechanism is therefore effective to impart feeding movements to the ram in either direction.

For imparting rapid traverse movements to the head 38 or ram 48, a motor M6 mounted at the right end of the cross rail 30 is adapted to be connected by means of the clutches 115 and 116 with either the ram driving shaft 117 or the head feeding screw 118 selectively. Thus, by appropriate manipulation of the clutches 112, 115 and 116 either feeding or rapid traverse movements may be imparted to the head 38 or the ram 48 in either direction. As the feeding movements are derived from the work support driving mechanism, such movements are accurately coordinated with the movements of the work support. Movements of the head and ram may be interrupted, of course, by setting the clutches 115 and 116 in neutral position.

As herein shown, vertical movements are imparted to the cross rail 30 by means of feed screws 125 and 126 extending vertically between the ways of the columns 26 and 27 and threading into stationary nuts 127 and 128 fixed to the saddles 63 and 64 which support the cross rail. The screws are driven through sets of bevel gears 129 and 130 slidably connected with a drive shaft 131 journaled on and extending longitudinally of the arch 60. A reversible motor M7 mounted on the arch is arranged to drive the shaft 131 through a suitable speed reducer 132.

Means is provided for rigidly clamping each of the movable machine elements selectively in adjusted position to insure absolutely rigid support for the tools or work, as the case may be, during a machining operation. The clamping means may be of any suitable or well-known type and preferably are power operated. In the exemplary machine, clamps 135 are provided for clamping the headstocks 35 and 37 to their respective ways and similar clamps 136 serve when applied to clamp the heads 36 and 38 to the ways upon which they are mounted. Clamps 137 are available to lock the cross rail 30 to the saddles 63 and 64. The columns 26 and 27 may be locked in adjusted position on the ways 52 and 53 by clamps 138 carried by the column bases 50 and 51. The upper ends of the columns likewise may be rigidly locked to the arch 60 by means of clamps 139. Clamps 140 and 141 when applied are effective respectively, to clamp the slide 17 to the ways 24, and the table 16 to the slide 17.

The operation of the various driving motors, the engagement and disengagement of the clutches heretofore referred to and the application and release of the clamps may be effected by control mechanisms of well-known construction which, per se, form no part of the present invention. It will be understood, of course, that the various controls are suitably interlocked so that the feeding or adjusting transmissions cannot be engaged when the clamps are operated or vice versa. Moreover, interfering movements of various elements are guarded against so that damage to either the machine or the work is effectually prevented.

The machine may be quickly and easily set up for performing any of the various types of machining operations on workpieces of the range of sizes within its capacity. For milling operations, the spindles 40 and 41 of the headstocks 35 and 37 are equipped with suitable milling cutters. The work is secured to the table 16, and the columns 26 and 27 and the cross rail 30 are adjusted so as to bring the tools into operative position with a minimum of spindle overhang. The various clamps are released during such adjustment, and are reapplied after adjustment is effected to hold the machine elements rigidly in fixed positions. Relative feed movements between the tools and work may be obtained either by translation of the work support slide 17, rotation of the work table 16, axial movements of the tool supporting spindles or translation of the headstocks on their respective ways. The wide range of movements thus obtainable makes it possible to machine a large variety of workpieces.

Drilling and boring operations may also be performed with suitable tools mounted on the spindles 40 and 41. In such operations the work supporting slide 17 and table 16 are ordinarily clamped in adjusted position and feed is obtained through axial translation of the spindles. Proper location of the work and tools is quickly and easily effected through suitable adjustments of the machine elements.

Turning, boring, facing and like operations performed with non-rotating tools are carried out with the aid of the heads 36 and 38. Relative feeding movement of the tools and work may be obtained by translation of the slide 17, by rotation of the table 16, by axial feeding of the rams 45 or 46 or by translation of the heads along their respective ways.

The foregoing operations may be performed simultaneously on the top and one side of a workpiece which materially increases the operating efficiency and capacity of the machine. Moreover, different areas of a workpiece may be presented for the action of the tools and accurately located with respect thereto by appropriate movements of the machine elements and without requiring a resetting of the workpiece on the work support. Thus all four sides of a workpiece may be presented to the tool carried by the spindle 40 by rotation of the table 16, and selected areas on any side may be accurately alined with the tool by translation of the slide 17. Likewise, any selected area on the upper face of the workpiece may be presented for action by the tool carried by the spindle 41 by appropriate movements of the slide, the table or the headstock.

A high degree of precision is insured in all cases by the adjustability of the columns 26 and 27 and the cross rail 30 to locate the tool carrying elements in close proximity to the work irrespective of the size of the same. In this way tool overhang is reduced to a minimum for any size workpiece, and extremely rigid, vibrationless support is provided for the tools.

We claim as our invention:

1. In a machine tool of the class described, in combination, a rigid bed, a rotatable work support mounted on said bed, means including a motor mounted on said bed for rotating said table, a pair of upright columns mounted on said bed at opposite sides of said work support for movement toward and from the same, a cross rail supported and guided on said columns for movement toward and from said work support, a tool head mounted on said cross rail for translation longitudinally thereof, a feed screw for translating said tool head, a motor mounted on said rail, and means operable selectively for establishing a driving connection from either of said motors to said feed screw.

2. In a machine of the class described, in combination, a movable work support, means including a motor for driving said work support, an upright column located at one side of said work support and adjustable toward and from the same, a head supported and guided for vertical movement on said column, a ram on said head movable longitudinally toward and from said work support, a motor on said head, and means operable selectively for connecting either of said motors for driving either said head or said ram.

3. A machine tool comprising, in combination, a horizontal elongated bed, a work support on an intermediate portion of said bed, two upright columns supported and guided respectively on opposite end portions of said bed for sliding adjustment toward and from opposite sides of said work support, each column having vertical guideways, two saddles mounted on said respective guideways for vertical adjustment on said columns and having horizontal guideways extending longitudinally of said bed, means for adjusting said saddles, a cross rail mounted at opposite ends on said horizontal guideways for relative sliding adjustment of said saddles with said columns, the upper ends of said columns having horizontal guideways extending longitudinally of said bed, a bridging member mounted at opposite ends on said last mentioned guideways for relative sliding adjustment of said columns, a tool head mounted on one of said columns for vertical translation, a tool head mounted on said cross rail for horizontal translation, and means for respectively translating said heads.

4. A machine tool comprising, in combination, a horizontal elongated bed, a work support comprising a horizontal slide mounted on an intermediate portion of said bed for translation transversely thereof and a rotary work table mounted on said slide for rotation about a vertical axis, means for selectively translating and rotating said slide and table, two upright columns supported and guided respectively on opposite end portions of said bed for sliding adjustment toward and from opposite sides of said work support, each column having vertical guideways, two saddles mounted on said respective guideways for vertical adjustment on said columns and having horizontal guideways extending longitudinally of said bed, means for adjusting said saddles, a cross rail mounted at opposite ends on said horizontal guideways for relative sliding adjustment of said saddles with said columns, the upper ends of said columns having horizontal guideways extending longitudinally of said bed, a bridging member mounted at opposite ends on said last mentioned guideways for relative sliding adjustment of said columns, a tool head mounted on one of said columns for vertical translation, a tool head mounted on said cross rail for horizontal translation, and means for respectively translating said heads.

5. A machine tool comprising, in combination, a horizontal elongated bed, a work support on an intermediate portion of said bed, two upright columns supported and guided respectively on opposite end portions of said bed for sliding adjustment toward and from opposite sides of said work support, each column having vertical guideways, two saddles mounted on said respective guideways for vertical adjustment on said columns and having horizontal guideways extending longitudinally of said bed, a cross rail mounted at opposite ends on said horizontal guideways for relative sliding adjustment of said saddles with said columns, the upper ends of said columns having horizontal guideways extending longitudinally of said bed, a bridging member mounted at opposite ends on said last mentioned guideways for relative sliding adjustment of said columns, means including a drive motor mounted on said bridging member for simultaneously adjusting said saddles in synchronism along said first mentioned vertical guideways to elevate or lower said cross rail, a tool head mounted on one of said columns for vertical translation, a tool head mounted on said cross rail for horizontal translation, and means for respectively translating said heads.

HANS B. KRAUT.
KEITH F. GALLIMORE.